US011358275B2

(12) United States Patent
Haddadin et al.

(10) Patent No.: US 11,358,275 B2
(45) Date of Patent: Jun. 14, 2022

(54) DRIVE UNIT FOR A ROBOT AND METHOD FOR MANUFACTURING THE SAME

(71) Applicant: FRANKA EMIKA GmbH, Munich (DE)

(72) Inventors: Sami Haddadin, Hannover (DE); Tim Rokahr, Munich (DE)

(73) Assignee: FRANKA EMIKA GmbH, Munich (DE)

(*) Notice: Subject to any disclaimer, the term of this patent is extended or adjusted under 35 U.S.C. 154(b) by 464 days.

(21) Appl. No.: 16/095,326

(22) PCT Filed: Apr. 20, 2017

(86) PCT No.: PCT/EP2017/059448
§ 371 (c)(1),
(2) Date: Oct. 19, 2018

(87) PCT Pub. No.: WO2017/182594
PCT Pub. Date: Oct. 26, 2017

(65) Prior Publication Data
US 2019/0134811 A1 May 9, 2019

(30) Foreign Application Priority Data
Apr. 20, 2016 (DE) .......................... 102016004787.9

(51) Int. Cl.
*B25J 9/12* (2006.01)
*B25J 17/00* (2006.01)
*B25J 9/00* (2006.01)

(52) U.S. Cl.
CPC ............. *B25J 9/126* (2013.01); *B25J 9/0009* (2013.01); *B25J 17/00* (2013.01)

(58) Field of Classification Search
CPC ... B25J 9/106; B25J 9/126; B25J 17/00; B25J 17/0241; B25J 17/025; Y10S 901/28
See application file for complete search history.

(56) References Cited

U.S. PATENT DOCUMENTS 4,025,838 A 5/1977 Watanabe
4,398,110 A * 8/1983 Flinchbaugh .......... B25J 9/1025
310/83

(Continued)

FOREIGN PATENT DOCUMENTS

AT 509927 A2 12/2011
CA 2940490 A1 9/2015

(Continued)

OTHER PUBLICATIONS

International Search Report and Written Opinion for Application No. PCT/EP2016/069339 dated Oct. 17, 2016.

(Continued)

*Primary Examiner* — Bobby Rushing, Jr.
(74) *Attorney, Agent, or Firm* — Dilworth IP, LLC

(57) ABSTRACT

A drive unit for joint being arranged between two arm members of a manipulator of a robotic system, the drive unit being intended for the rotatory drive of one arm member in relation to the other arm member, the drive unit having a first drive module, which is to be connected to a first arm member by means of at least one connecting element in a force- and torque-transmitting manner, and having a second drive module, which is to be connected with a second arm member by means of at least one connecting element in a force- and torque-transmitting manner, in which the connecting elements are configured to cooperate with the arm members in radial direction with respect to the rotary axis of the drive unit.

28 Claims, 12 Drawing Sheets

(56) References Cited

U.S. PATENT DOCUMENTS

| | | | |
|---|---|---|---|
| 4,591,198 A | 5/1986 | Monforte et al. | |
| 4,659,971 A | 4/1987 | Suzuki et al. | |
| 4,678,952 A * | 7/1987 | Peterson | B25J 9/1025 310/83 |
| 4,804,304 A | 2/1989 | Tellden et al. | |
| 5,360,249 A | 11/1994 | Monforte et al. | |
| 5,732,599 A * | 3/1998 | Iriyama | B25J 17/0241 74/490.02 |
| 6,422,441 B1 | 7/2002 | Settelmayer et al. | |
| 6,463,360 B1 | 10/2002 | Terada et al. | |
| 7,230,402 B2 * | 6/2007 | Kumagai | B25J 17/00 318/568.11 |
| 8,226,140 B1 | 7/2012 | Dietrich et al. | |
| 8,423,189 B2 | 4/2013 | Nakanishi et al. | |
| 9,475,199 B2 * | 10/2016 | Burridge | B25J 9/06 |
| 2008/0016979 A1 | 1/2008 | Yasumura et al. | |
| 2009/0178506 A1 * | 7/2009 | Yamamoto | B25J 9/102 74/490.03 |
| 2009/0289591 A1 | 11/2009 | Kassow et al. | |
| 2009/0314120 A1 | 12/2009 | Larsson et al. | |
| 2010/0198394 A1 | 8/2010 | Trygg | |
| 2010/0314895 A1 | 12/2010 | Rizk et al. | |
| 2011/0190932 A1 | 8/2011 | Tsusaka et al. | |
| 2013/0151010 A1 | 6/2013 | Kubota et al. | |
| 2013/0255426 A1 * | 10/2013 | Kassow | B25J 18/00 74/490.03 |
| 2013/0273818 A1 | 10/2013 | Guan et al. | |
| 2014/0060223 A1 * | 3/2014 | Tanaka | F16H 21/40 74/89 |
| 2014/0224057 A1 * | 8/2014 | Tanaka | B25J 17/00 74/490.05 |
| 2015/0053040 A1 | 2/2015 | Ueda et al. | |
| 2016/0193735 A1 * | 7/2016 | Krumbacher | B25J 17/00 74/490.02 |
| 2016/0221185 A1 * | 8/2016 | Sueyoshi | B25J 9/102 |
| 2018/0207795 A1 | 7/2018 | Haddadin et al. | |
| 2018/0345505 A1 | 12/2018 | Haddadin | |
| 2018/0354141 A1 | 12/2018 | Haddadin | |
| 2018/0361594 A1 | 12/2018 | Haddadin | |

FOREIGN PATENT DOCUMENTS

| | | |
|---|---|---|
| CN | 201437046 U | 4/2010 |
| CN | 102302858 A | 1/2012 |
| CN | 102410342 A | 4/2012 |
| CN | 104802156 A | 7/2015 |
| DE | 197 31 656 C1 | 1/1999 |
| DE | 199 56 176 A1 | 10/2001 |
| DE | 699 21 721 T2 | 11/2005 |
| DE | 10 2005 054575 B3 | 4/2007 |
| DE | 10 2008 062622 A1 | 6/2010 |
| DE | 10 2009 039104 A1 | 3/2011 |
| DE | 10 2010 063 222 A1 | 6/2012 |
| DE | 10 2013 013679 A1 | 2/2014 |
| DE | 10 2013 109753 A1 | 3/2014 |
| DE | 10 2014 216514 B3 | 9/2015 |
| EP | 441397 A1 | 8/1991 |
| EP | 1435737 A1 | 7/2004 |
| EP | 1880809 A1 | 1/2008 |
| EP | 2129498 A1 | 12/2009 |
| EP | 2131257 A1 | 12/2009 |
| EP | 2548706 A1 | 1/2013 |
| EP | 2784612 A2 | 10/2014 |
| EP | 2851162 A2 | 3/2015 |
| EP | 2864085 A2 | 4/2015 |
| EP | 2868439 A1 | 5/2015 |
| JP | S60 123288 A | 7/1985 |
| JP | S61 252084 A | 11/1986 |
| JP | S62 87153 A | 4/1987 |
| JP | H03502507 A | 6/1991 |
| JP | H08281580 A | 10/1996 |
| JP | 2000-218584 A | 8/2000 |
| JP | 2008-23642 A | 2/2008 |
| KR | 2014-0011973 A | 1/2014 |
| WO | WO 2007/082954 A1 | 7/2007 |
| WO | WO-2007082954 A1 * | 7/2007 | B25J 9/1025 |
| WO | WO 2007/099511 A2 | 9/2007 |
| WO | WO 2009/124904 A1 | 10/2009 |
| WO | WO 2010/088959 A1 | 8/2010 |
| WO | WO 2011/107143 A1 | 9/2011 |
| WO | WO 2014/162161 A1 | 10/2014 |
| WO | WO 2014/170355 A1 | 10/2014 |
| WO | WO 2015/113757 A1 | 8/2015 |

OTHER PUBLICATIONS

International Preliminary Report on Patentability for Application No. PCT/EP2016/069339 dated Feb. 20, 2018.

International Search Report and Written Opinion for Application No. PCT/EP2016/074250 dated Jan. 30, 2017.

International Search Report and Written Opinion for Application No. PCT/EP2016/074251 dated Feb. 2, 2017.

International Search Report and Written Opinion for Application No. PCT/EP2016/074252 dated Feb. 2, 2017.

International Search Report and Written Opinion for Application No. PCT/EP2017/059448 dated Aug. 1, 2017.

International Preliminary Report on Patentability for Application No. PCT/EP2017/059448 dated Oct. 23, 2018.

International Search Report and Written Opinion for Application No. PCT/EP2017/059446 dated Jul. 19, 2017.

International Preliminary Report on Patentability for Application No. PCT/EP2017/059446 dated Oct. 23, 2018.

International Search Report and Written Opinion for Application No. PCT/EP2017/059572 dated Jul. 27, 2017.

International Preliminary Report on Patentability for Application No. PCT/EP2017/059572 dated Oct. 30, 2018.

[No Author Listed], "Advanced Automation for Space Missions," NASA Conference Publication 2255, Aug. 29, 1980, pp. 1-335. Retrieved from https://ntrs/nasa/gov/archive/nasa/casi.ntrs.nasa.gov/19830007077.pdf on Jul. 7, 2017.

Sakakibara, A two-armed intelligent robot assembles mini robots automatically. Industrial Electronics, Control, and Instrumentation. Proceedings of the 1996 IEEE IECON 22nd International Conference on Taipaei, Taiwan. 1996;3(5):1879-1883.

Schafer et al., Light-Weight Mechatronics and Sensorics for Robotic Exploration: a DLR Perspective. Feb. 25, 2008. Retrieved from http://elib.dlr.de/55362/1/i-sairas2008_Schafer.pdf on Mar. 24, 2017.

* cited by examiner

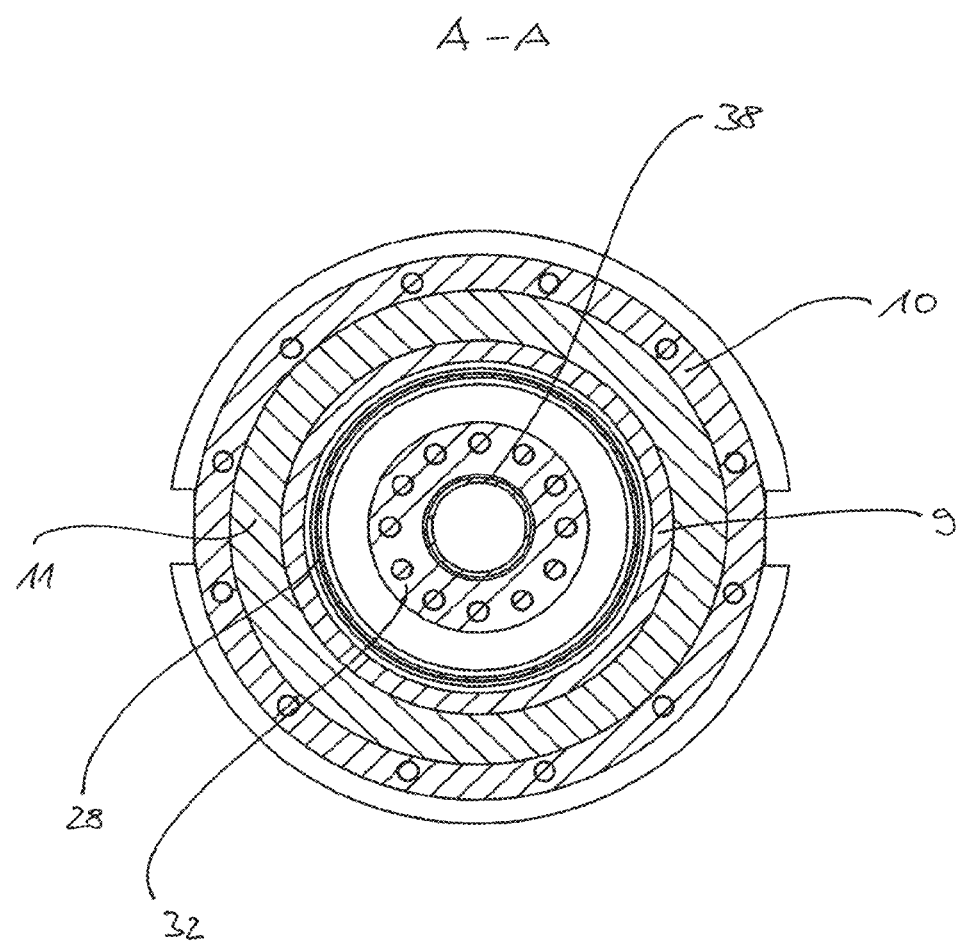

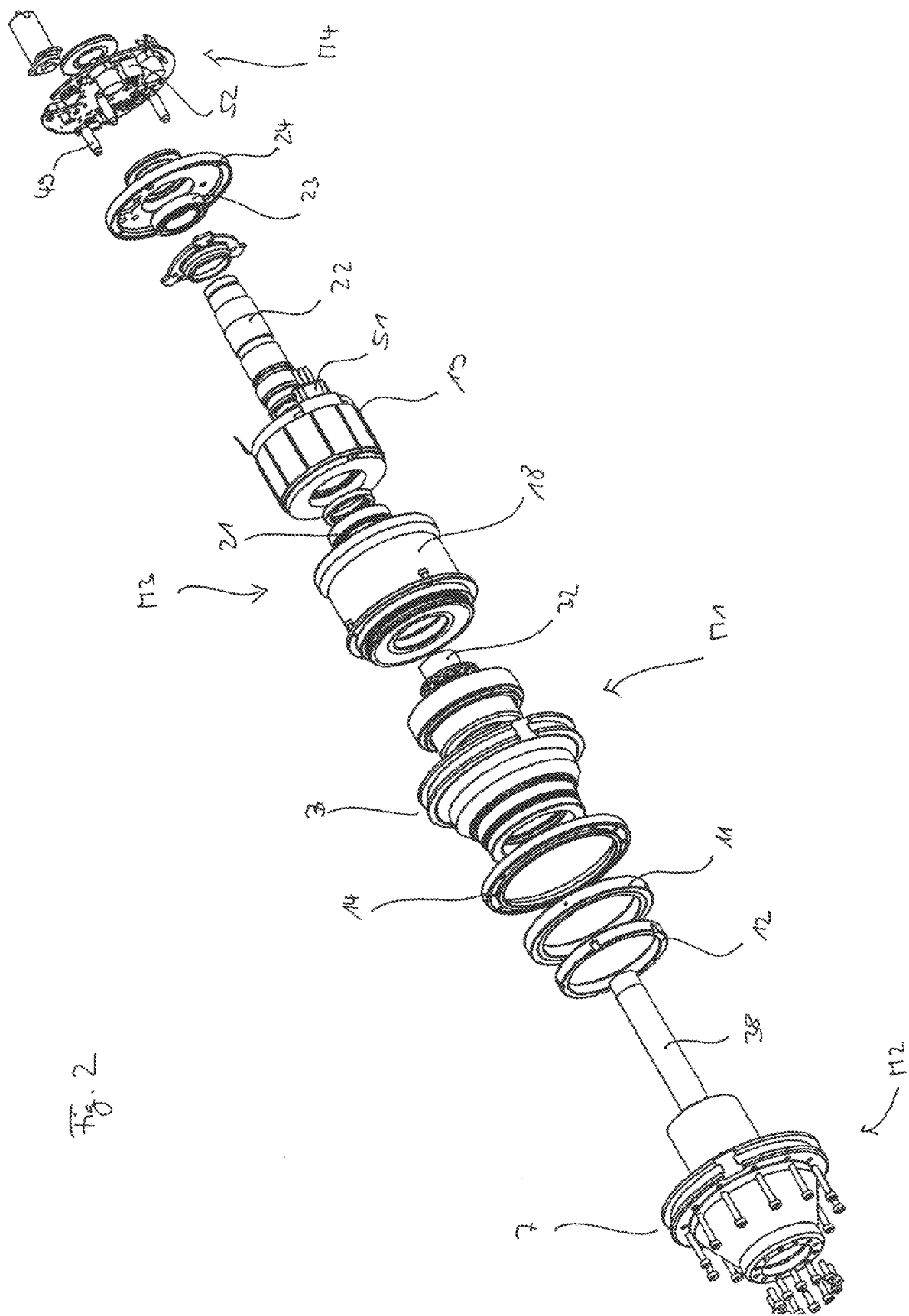

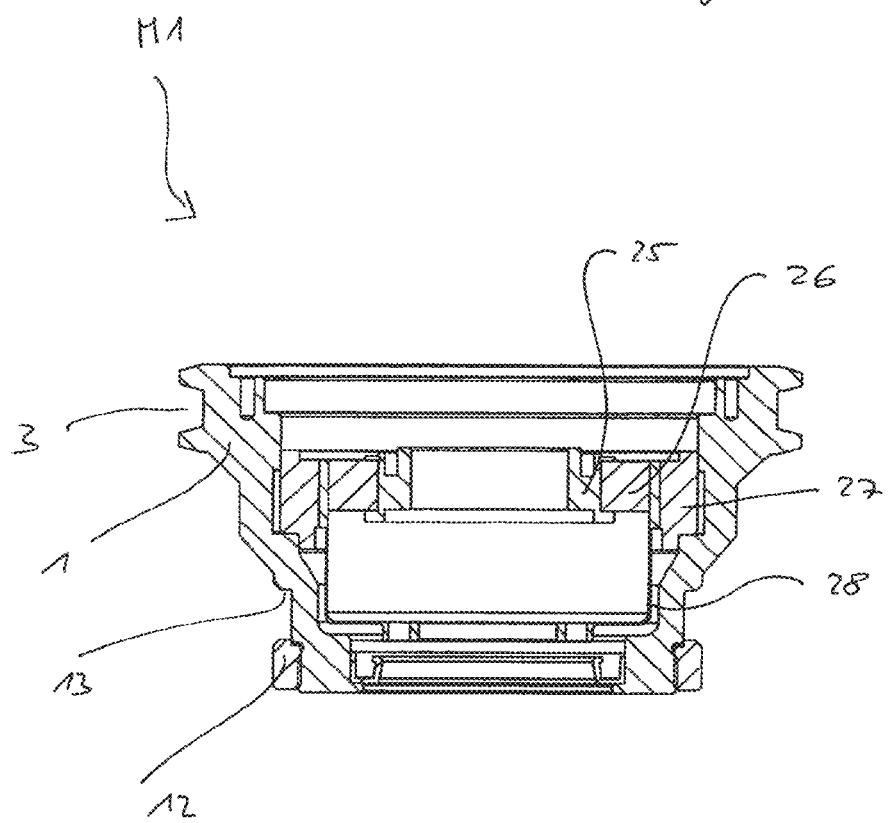

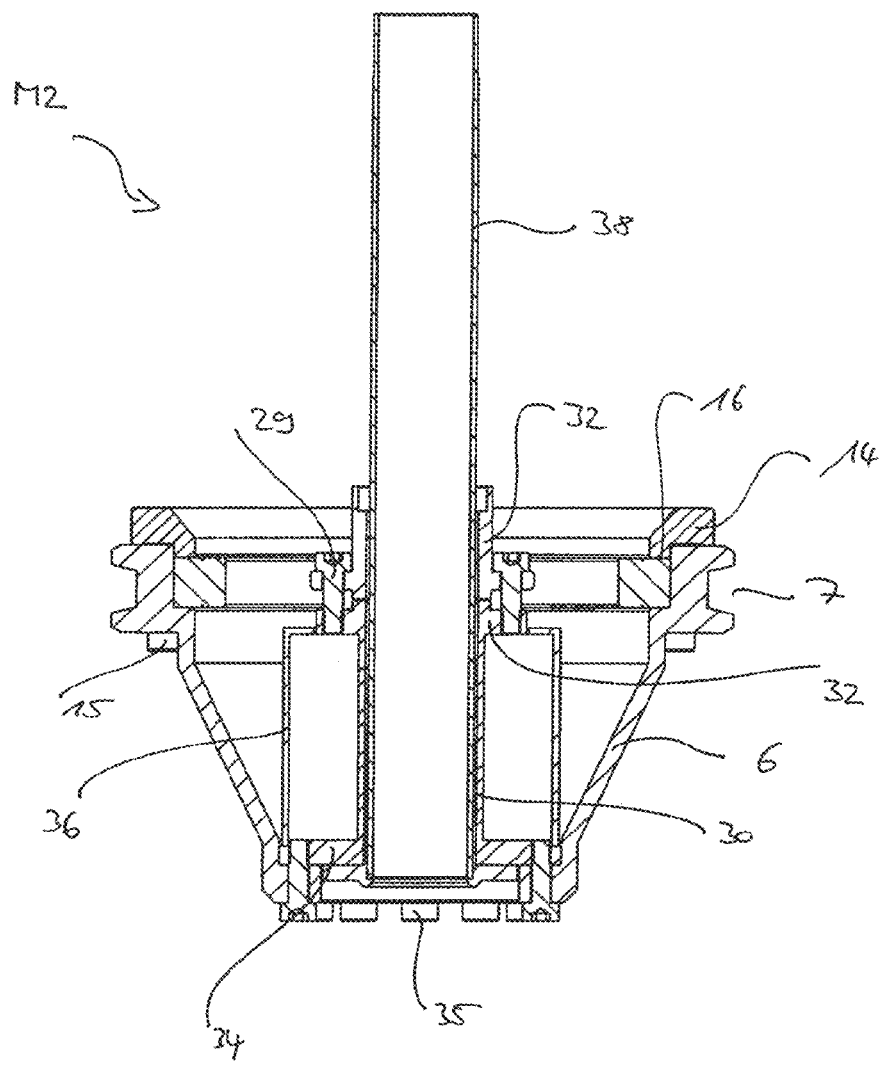

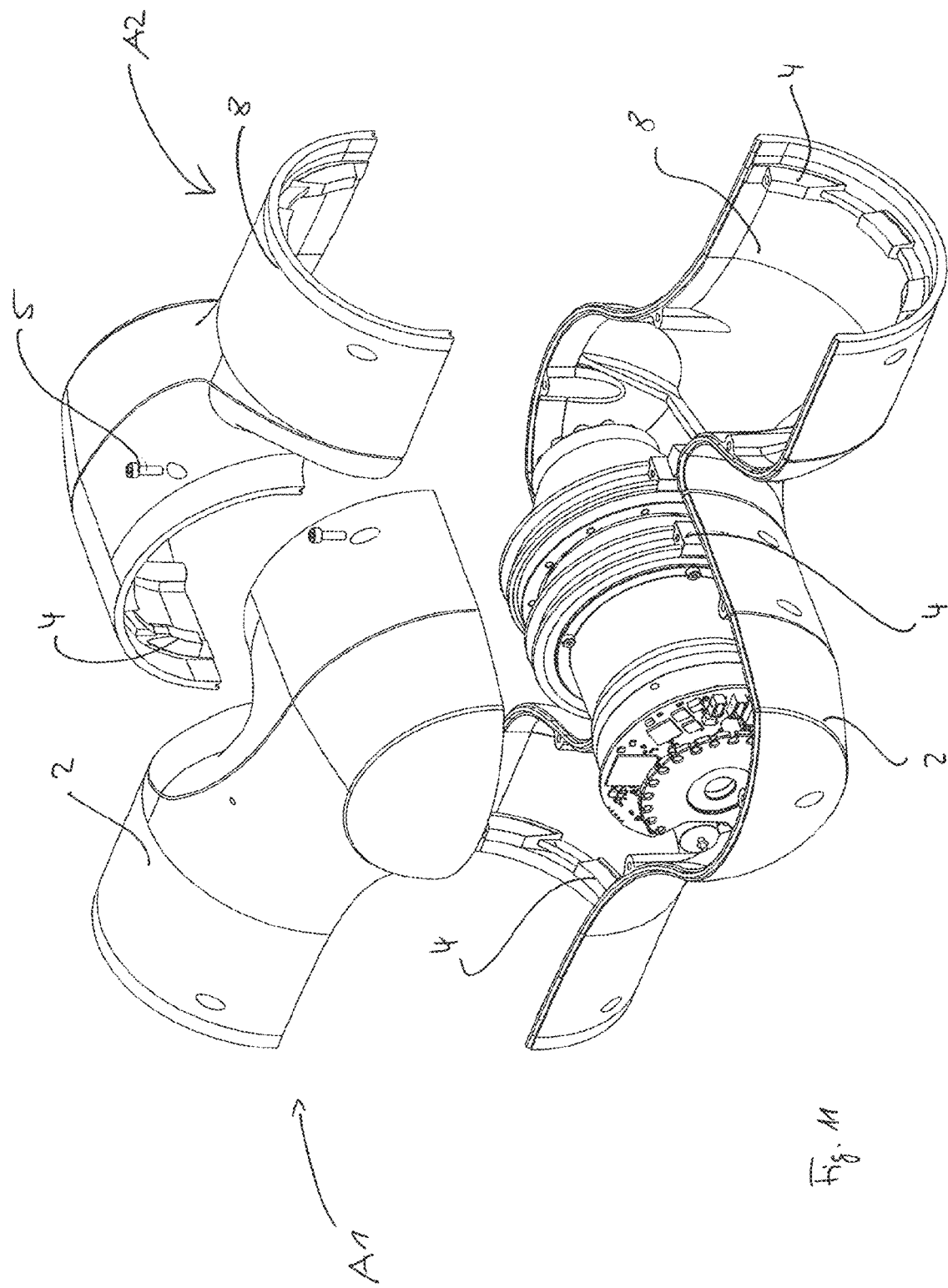

DRIVE UNIT FOR A ROBOT AND METHOD FOR MANUFACTURING THE SAME

RELATED APPLICATIONS

This application is a national stage filing under 35 U.S.C. § 371 of International Patent Application Serial No. PCT/EP2017/059448, filed Apr. 20, 2017, entitled "Drive Unit for a Robot and Method for Manufacturing the Same," which claims priority to German application serial number 10 2016 004 787.9, filed Apr. 20, 2016. Each of these is incorporated herein by reference in its entirety.

BACKGROUND OF THE INVENTION

The present invention relates to a drive device or drive unit for a joint between two axle or arm members of a manipulator of a robotic system, as well as to a method for manufacturing such drive unit.

Drive units, which are used in manipulators of robotic systems and robot arms, respectively, are intended to arrange one axle or arm member movably, preferably rotatably, in relation to a subsequent arm member of a robot arm, which robot arm usually is constructed with a plurality of axes. The movability between two adjacent arm members being realized thereby results in corresponding degrees of freedom of the robotic system depending on the number of the arm members of the manipulator.

In the case of industrial robots, drive units are employed which allow a rotation of an arm member around an axis being traverse to its longitudinal extension. Further, drive units are configured to allow a rotation around the longitudinal axis of the arm member. For that purpose, correspondingly dimensioned electric motors are usually used, which, where appropriate, cooperate with corresponding reduction gears.

With respect to light-weight robots, the drive units are mounted inside the self-contained housing of the arm members, since the housings of manipulators of robots of such kind are in principle configured as exoskeletons. For example, from Int. patent application WO 2007/099511 A2, a drive unit is known in which an electric motor as well as a gear cooperating with it are arranged in a common housing, wherein an output flange is rotatably supported in the housing at a face-side of it. The housing of the drive unit is inserted into the radially closed housing of an arm member, while the output flange is connected with an arm member adjacent thereto such that said arm member is rotatably supported in relation to the arm member comprising the drive unit. While the housing of the drive unit usually is at least partly around its circumference connected with the housing of the arm member, the output flange is connected with an element of the subsequent arm member in a mere axially orientated manner. The torque thus is transferred onto the next arm member by means of connecting elements acting in axial direction.

In the case of exoskeleton-type housings of robotic systems of the light-weight kind, however, the problem exists that due to the circumferentially, self-contained housing structures, all components, as well as the drive units have to be axially inserted into the housing of the arm members and to be assembled there in a cumbersome way due to the very restricted accessibility. This can be carried out both from the side of the arm member, which follows the face-side of the next arm member, and from the side being opposite to said face-side, for which, however, mounting openings in the housing have to be provided, which openings are to be closed by covers, associated basically with the drawback of an attenuation of the rigidity and torsional stiffness of such a housing.

Furthermore, the construction of such a drive unit has to be based on the restricted and hardly accessible assembly spaces, both in terms of the configuration and the functional interaction of the single drive components inside the housing of the drive unit and in terms of the connection of the drive unit to the arm members, which are to be rotatably supported relative to each other, which result in significant constructional limitations.

However, the radially enclosed housing structure with such manipulators inevitably also leads to the fact that, besides the assembly, any maintenance and repair also proves to be very cumbersome, and in particular with respect to the fixation of the drive units in the housing itself as well as with respect to their disassembly and with respect to the assembly and disassembly, respectively, and the guiding of supply lines for the motor and the signal lines for the different sensors being employed in such drive units.

In order to render the mounting and dismounting of the drive units for such housing structures as simple as possible, these drive units usually are pre-mounted as inseparable complete units.

However, this in turn has the drawback that in the event of malfunctions of the motor, the gear, the sensor system as well as of further mechatronic components being employed in such drive units, the entire drive unit has to be dismounted and removed, and in particular in combination with the same spatial constraints and efforts associated therewith as compared to the previous mounting.

The drive units being configured and constructed as integrated uniform structures, such as known from the prior art as explained before, can then only be repaired with increased efforts, if at all; parts of the gear, of the motor or of the sensor system can be only replaced if the drive unit gets dismounted in its entirety.

Naturally, the efforts for the assembly and the maintenance for such drive units prove to be time-consuming and thereby cost-intensive. A quick repair, which only interrupts the operation to be carried out by a robot, such as a production process, is not possible. A further disadvantage lies in the fact that, especially for manipulators or robot arms of robots of the light-weight kind, the arm members for providing the desired degrees of freedom can comprise different lengths depending on the configuration, i.e., differently formed and dimensioned drive units need to be manufactured for the rotatory connection between the single arm members and have to be kept on stock for the purpose of repair, respectively, which further increases the costs.

Also, in an as compact as possible configuration, the drive units being formed as one single unit only are usually not configured and provided for adapting single components, such as of the gear, to different constructional circumstances with respect to the manipulator or to different performance requirements for the robotic systems depending on demands.

Therefore, the drive units as known from the prior art are limited in use with respect to robotic systems, in particular of the light-weight type.

BRIEF SUMMARY OF INVENTION

Based on the above, it is an object of the present invention to provide a drive unit for a joint between two arm members of a manipulator of a robotic system, in particular but not exclusively of the light-weight kind, which overcomes the afore-mentioned drawbacks as known from the prior art, which in particular enables a simplified assembly and maintenance as well as offers a certain variability and adaptability to different spatial and/or kinematic circumstances, which exist in connection with manipulators of a robotic system, as well as to desired performance parameters.

This object is solved by a drive unit for a joint being arranged between two arm members of a manipulator of a robotic system according to the claims as well as by a method for manufacturing and mounting of such a drive unit according to the claims.

Thus, the invention relates to a drive unit for a joint being arranged between two arm members of a manipulator of a robotic system, the drive unit being intended for the rotary drive of the one arm member in relation to the other arm member, having a first drive module which is to be connected with a first arm member by means of at least one connecting element in a force- and torque-transmitting manner, and having a second drive module, which is to be connected with a second arm member by at least one connecting element in a force- and torque-transmitting manner, wherein the second drive module is co-axially arranged with respect to the first drive module and being rotatably supported in relation to it, in order to cooperate with the arm members in a radial direction to the rotational axis of the drive unit.

In other words, according to the invention the connecting elements are configured such that these cooperate with the housings of the arm members and with connecting elements provided therewith, respectively, in a radial orientation.

The first and the second drive module are configured as module components such that these in itself form self-contained and thus exchangeable units, as is explained further in more detail below.

Preferably, therefor the first drive module and the second drive module are formed as components which are rotationally symmetric, wherein the connecting elements comprise the same diameter.

Thereby housing parts between two adjacent arm members of a manipulator can be used which, after assembly, form a continuous, flat housing covering for the manipulator.

Preferably, the connecting elements are configured as radially surrounding grooves which are located on one common imaginary shell surface, while the further housing sections of the components are offset radially and inwardly.

Such ring grooves are suited for the reception of insert blocks or similar, which are provided at the inner side of the housing parts of the arm members, preferably being integrally arranged therewith. With respect to a possible connection of the insert blocks with the ring grooves, into which the insert blocks will be tangentially inserted, as an example reference is made to German patent application no. 10 2015 012 960.0, the contents of which are incorporated by reference herein.

According to the invention, in order to realize a rotatable support of the second drive module in relation to the first drive module, the first drive module and the second drive module mesh or engage with each other in sections and at least one rotary and radial bearing, respectively, for example a radial roller bearing, is arranged between a radially outer section of the housing of the first drive module and a radially inner section of the housing of the second drive module. Preferably these sections are arranged within the connecting element of the second drive module with respect to the radial direction in order to enable a better stability of the support and a better radial force and torque transmission. The radial bearing can be fixed in that a first fixation element, which is arranged at a face-side end of the housing of the second drive module, which end faces the first drive module, and that a second fixation element, which is arranged at a face-side end of the housing of the first drive module, which end faces the second drive module, enclose the housing of the radial bearing, by which the position of the radial bearing in axial direction is determined.

For example, the second fixation element may be a threaded ring which can be simply screwed onto an outer thread being provided at the end of the housing of the first drive module. The first fixation element may be formed as a flange or counter ring, which simply will be detachably fixed or screwed at the housing of the second drive module.

A third drive module, which receives a motor, is to be fixed at the housing of the first drive module, co-axially opposite to the second drive module, wherein the third drive module and the first drive module do mesh or engage with each other in sections.

The motor, usually an electric motor having an internal rotor, drives or actuates a drive shaft being centrally supported in the drive unit, which drive shaft extends into the first drive module and is to be connected to an input element of a gear, which is arranged in the first drive module. The gear is preferably a harmonic or wave gear.

The output element of the gear is connected with the second drive module in a rotationally fixed, i.e., torque-transmitting manner. In case the installation length of the drive unit shall be correspondingly short, the output element of the gear may be directly connected with a housing section of the second drive module, which then comprises a corresponding small axial extension. In case a larger installation length becomes necessary, the output element of the gear is to be connected with an output shaft, which is arranged inside the housing of the second drive module and is connected therewith in a rotationally fixed manner.

Further, a fourth drive module can be arranged at the face-side on the third drive module, co-axially opposite to the first drive module, which comprises sensors for the drive unit and a control for the motor, wherein the drive shaft extends out from the third drive module up to the side of the fourth drive module, which side faces the third drive module.

According to a further embodiment, the drive shaft and the output shaft each are formed as a hollow shaft and being co-axially arranged with respect to each other so that a sensor shaft, which is to be connected in a rotationally fixed manner, i.e., torque-transmitting way with the housing of the second drive module, traverses both the drive shaft and the output shaft with a radial distance and extends up to the fourth drive module. The sensor shaft is intended to cooperate with a corresponding sensor system inside the fourth drive module for detecting the output torque and the output rotational speed of the drive unit, respectively.

Each joint of a manipulator, e.g., of a light-weight robot, may comprise, depending on the actual construction and the intended purpose, a different dimension and different performance characteristics. Therefore, in this connection the invention is characterized by the fact that the connecting mechanisms between the first and the second drive module, between the first and the third drive module and between the third and fourth drive module are configured and constructed in such a way that different configurations and/or dimensions of said drive modules with different variations can be combined in order to either adapt the axial installation length to the respective existing spatial installations requirements of a manipulator or to the desired performance requirements for the drive unit of the joint between two arm members. The entire installation length of the drive unit e.g., results from the sum of all individual installation lengths of single drive modules. A performance-related adaption with respect to the transmission of a desired torque or the provision of a desired rotational speed e.g., results from the selection of the type for the gear and the configuration of the gear, respectively, and from the selection of the type of the drive motor.

In order to enable such variability, it is provided according to the invention that the third drive module is configured so as to functionally cooperate and to be connected with different configurations of the fourth drive module, that the first drive module is configured so as to functionally cooperate and to be connected to different configurations of the third drive module, and in particular that the first drive module is configured so as to functionally cooperate and to be connected with different configurations of the second drive module in a rotatable support, wherein also the third drive module and the second drive module may be configured so as to functionally cooperate and to be connected with different configurations of the first drive module. Thus, the drive unit according to the invention provides an adaptability which results from the exchangeability of the single drive modules both with respect to spatial and also functional aspects. Thereby, different manipulators can be realized by the modular concept of the invention in that the corresponding drive modules are combined easily, which as such speaks for an own inventive meaning.

The constructive configuration of the single drive units, which enables the exchangeability, moreover, according to the invention allows to provide a method for manufacturing and assembly of such a drive unit which method realizes, beside a substantially simplified assembly, subsequently a simplified repair and maintenance. Therefore, the invention also relates to a method of manufacturing a drive unit for a joint being arranged between two arm members of a robotic system, the drive unit being intended for the rotary drive of the one arm member in relation to the other arm member, in which the drive unit comprises a plurality of drive modules, which are co-axially arranged with respect to each other, wherein a first drive module will be connected to a second drive module by the following steps:

mounting or fixing of a radial bearing on a section of the housing of a first drive module, in that a fixation element is arranged at a face-side end of the housing of the first drive module, which end faces a second drive module;

partly inserting the first drive module into the second drive module so that a section of the housing of the second drive module overlaps the radial bearing;

mounting or fixing of the radial bearing on the section of the housing of the second drive module in that a fixation element is arranged at the face-side end of the housing of the second drive module, which end faces the first drive module, so that the radial bearing is encased in an axial position between the housing of the first drive module and the housing of the second drive module. Since the first drive module forms the gear unit, the method comprises the further step:

connecting an output element of the gear with the second drive module from the side of the gear and/or from the side of the second drive module.

The output element, for example the flexspline of a wave gear, may therefore be directly connected with the housing of the second drive module, in that bolts are screwed from the outer face-side of the second drive module and thereby connect the housing and the output element in a torque-transmitting manner.

In case the second drive module comprises an output shaft due to its longer configuration, the method may further comprise the step:

connecting the output shaft with the housing of the second drive unit and with the output element of the gear. The output shaft will be bolted with the output element from the inner side of the gear and, opposite to the output element, the output shaft will be bolted with the housing of the second drive module, so that a torque-transmitting connection is realized between the output element of the gear and the housing of the second drive module.

Moreover, the method may comprise:

mounting or fixing of a third drive module, which comprises a motor having a drive shaft, at the housing of the first drive module at the side being opposite to the second drive module thereby connecting the drive shaft with an input element of the gear.

Ideally, the face-side of the housing of the third drive module therefor comprises a stepped flange ring which is partly inserted into the housing of the first drive module and then bolted. For that purpose, the drive shaft may be pressed into the input element, e.g., an inner ring of a wave generator of a wave gear, by using a tolerance ring for taking up corresponding tolerance ranges.

In case the system shall also be embodied with a control and a sensor system, the method may further comprise:

mounting or fixing a fourth drive module at the third drive module co-axially opposite to the first drive module thereby realizing a motor connection.

For that purpose, the motor may comprise a plug connection for the power supply and the motor control, which plug connection is orientated such that it automatically enters into a secure connection with a complementary plug connection of the fourth drive module upon assembly of it.

If, according to one embodiment, the drive shaft and the output shaft each are formed as a hollow shaft, if the fourth drive module comprises an opening and if the second drive module is rotationally fixedly connected to a sensor shaft, the method according to the invention may finally complete the drive unit in that the sensor shaft will be traversed through the drive shaft of the third drive module, through the output shaft of the second drive module and through the opening of the fourth drive module with a defined radial distance.

The modularity of the drive unit is, beside the already mentioned adaptability, also characterized by the advantage that different suppliers can be used with respect to single components, such as motor and gear.

Moreover, the invention also relates to a robot having a manipulator which contains a plurality of arm members and containing at least one drive unit according to the aforementioned embodiments in at least one joint being arranged between arm members of the manipulator.

BRIEF DESCRIPTION OF DRAWINGS

Further advantages and features will become apparent by the description of the embodiments as illustrated in connection with the accompanying drawings, in which:

FIG. 1b is a cross-section along A-A of FIG. 1a;

FIG. 2 is an exploded view of this embodiment;

FIG. 3 shows a first drive module of the drive unit in a first embodiment according to the invention;

FIG. 4 shows a second drive module of the drive unit in a first embodiment according to the invention;

FIG. 11 is, as an example, an exploded view with a drive unit being inserted into a housing structure of two adjacent arm members.

FIG. 1a shows a first embodiment of a drive unit according to the invention in a cross-sectional view along a rotary axis, i.e., along a longitudinal extension of the drive unit. FIG. 1b shows a cross-section along A-A of FIG. 1a. As can be seen the drive unit is substantially formed by components and parts which are configured in a rotationally symmetric manner.

DETAILED DESCRIPTION OF INVENTION

According to the invention, a modular design and configuration is provided, for which a plurality of modules functionally cooperate in an axial orientation and mesh or engage with each other. The modules as such each are singularly exchangeable and can be connected with each other due to correspondingly constructed and configured connecting techniques according to the invention.

Figure 1A:
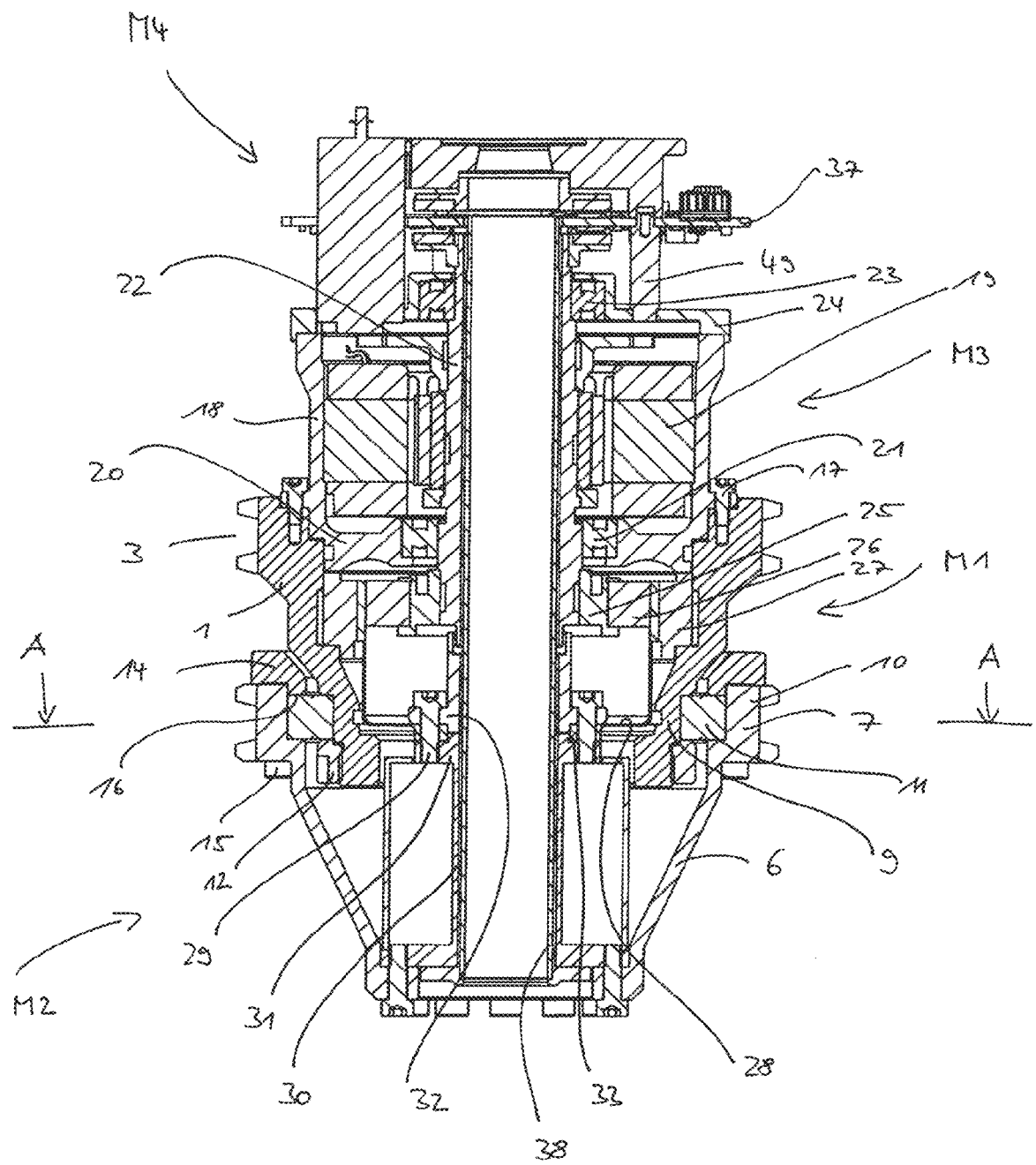
FIG. 1a is an axial longitudinal section along a modular drive unit in a first embodiment according to the invention.

The drive unit as shown in FIG. 1a consists of four drive modules which are functionally different. A first drive module M1 is intended for the reception of a gear and comprises a rotationally symmetric housing 1, as in particular can be seen from FIG. 3. The housing 1 may be made as an aluminum cast or as a machined component. It comprises a shape which tapers downwards and towards a second drive module M2, which shape is characterized by partly conical-type sections.

The first drive module M1 is intended for the connection of the drive unit to a housing or to housing halves 2 of a first arm member A1 of a manipulator and a robot arm, respectively, of a robotic system e.g., of the light-weight design as can be seen from FIG. 11. For this purpose, the housing 1 of the first drive module M1 comprises at its largest circumference a connecting element in the form of a radially surrounding ring groove 3, which groove 3 is integrally formed with the rotationally symmetric housing 1. The ring groove 3 is intended for the fixation of half shelf-type housing halves 2 of the first arm member A1 by means of connecting elements 4, which are provided at the inner side of the housing halves 2, as e.g. insert blocks being integrally formed with the housing halves 2, which insert blocks will be received by the ring groove 3, wherein a mounting of the drive unit in the housing halves 2 is performed by means of bolting with screws 5 from outside of the housing halves 2, as can be seen from FIG. 11.

Reference is made to the disclosure of German patent application no. 10 2015 012 960.0, to which content herein it is explicitly referred to, with respect to the mounting of the drive unit in the housing halves 2 on the one side and the mounting of the housing halves 2 with each other on the other.

In that the insert blocks 4 of the housing halves 2 of the first arm member A1 are received in the ring groove 3 of the housing 1 of the first drive module M1 and by the fixation of these by means of bolts 5 in a rotationally fixed manner, a force- and torque-transmitting connection between these both housing components is formed such that the first arm member A1 moves together with the first drive module M1 of the drive unit. Co-axially to the first drive module M1 a second drive module M1 is attached thereto, which serves for the output in relation to the first drive module M1. The second drive module M2 also comprises a rotationally symmetric and conically tapering housing 6 which at its largest diameter comprises a radially surrounding ring groove 7 as well, which as an integrally formed connecting element is aimed for the connection with housing halves 8 of a second arm member A2, as shown in FIG. 11. The fixation of the second drive module M2 at the housing halves 8 thereby is realized, as mentioned above, in a similar way as compared to the first drive module M1. As can be seen, both ring grooves 3 and 7 have a same diameter and are placed on a common imaginary cylindrical shell surface. The force- and torque-transmitting connection between the first drive module M1 and the first arm member A1 as well as between the second drive module M2 and the second arm member A1 is exclusively realized by means of the radially orientated connecting elements 3 and 7.

The second arm member A2 shall be rotatably supported in relation to the first arm member A1 so as to enable the required rotating connection.

For this purpose, the second drive module M2, which provides the output of the drive unit, is rotatably supported in relation to the first drive module M1.

According to the invention, it is thus provided that between a radially outwardly arranged section 9 of the housing 1 of the first drive module M1, which section 9 is preferably located in the area of its axial end facing the second drive module M2, and a radially inwardly arranged section 10 of the housing 6 of the second drive module M2, which section 10 is preferably located in the area of its axial end facing the first drive module M1, a rotary or radial bearing 11 is arranged, which bearing 11 retains both housings 1 and 6 in a rotating connection. Preferably, therefor a cross roller bearing is employed, since such embodiment proves to be of particular advantage with respect to traverse stiffness, axial stiffness, weight and friction as well as with respect to a simple mounting. However, it may also be possible to use double-row, pre-tensioned roller bearings or angular roller bearings.

For that, according to the invention, the radial bearing 11, which may comprise a suitable configuration, is fixed in its axial position by means of two fixation elements.

A first fixation element in the form of a threaded ring 12 is threaded onto a thread, which is provided at a face-side end of the housing 1 of the first drive module M1, which end faces the second drive module M2. By that the radial bearing 11 is clamped between a section 13 of the housing 1 and the threaded ring 12.

A second fixation element in the form of a flange or counter ring 14 is fixed on the face-side, annular end of the housing 6 of the second drive module M2, which end faces the first drive module M1, in that screws 15 pass the housing section of the ring groove 7 and clamp the flange ring 14 onto said housing section, as e.g., is shown by the exploded view of FIG. 2. The flange ring 14 keeps a certain radial distance to the housing 1 of the first drive module M1.

The flange ring 14 comprises a corresponding section 16 which fixes the radial bearing 11 then in relation to the threaded ring 12. Thereby, a rotating connection between both drive modules M1 and M2 is formed, which is designed and conceptualized as a kind of universal connection, which allows that different configurations and designs of the housing 6 of the second drive module M2 can be arranged at one and the same housing 1 of the first drive module M1 in a rotatable manner, as will be explained in the following in connection with further embodiments.

According to the invention, a best possible force and torque transmission onto the second arm member A2 is ensured by the axial positioning of the radial bearing 11 directly inside the ring groove 3.

Co-axially opposite to the second drive module M2, a third drive module M2 is provided which is bolted to the first drive module M1 e.g., by means of screws 17.

The housing 18 of the third drive module M3 is formed in a rotationally symmetric way as well and is aimed for the reception of an electric motor 19 for the drive, the configuration of which shall not be discussed herein further.

The housing 18 comprises a flange section 20 which is designed such that it is received by the housing 1 of the first drive module M1 in a radially surrounding manner so that a kind of universal connection is formed between the first drive module M1 and the third drive module M3 as well.

Radially inwardly arranged the flange section 20 comprises a first axial bearing 21 by which an inside supported drive shaft 22 being driven by the electric motor 19 is supported there. In order to provide a best possible stability, the first axial bearing 21 is provided at the height of the ring groove 3 of the first drive module M1. The drive shaft 22 is further rotatably supported by means of a second axial bearing 23 which is arranged in a housing cover 24, which covers the third drive module M3 towards the top.

As can be seen in FIG. 1, the drive shaft 22, which is radially stepped and formed as a hollow shaft, partly extends into the inside of the first drive module M1.

As already mentioned, the first drive module M1 is intended for receiving a gear by means of which the rotation of the drive shaft 22 will be reduced.

The embodiment shown is a harmonic or wave gear, which, as it is known, provides a high gear ratio and stiffness and which is preferably employed in the field of robotics. However, basically, one can also think of other gear types in this context, which provide the desired gear ratio.

The drive shaft 22 is rotationally fixedly connected to the input element of the wave gear, an inner ring 25 of the so-called wave generator. The inner ring 25 comprises an elliptic shape and supports a thin-walled roller bearing 26. Radially outside the so-called circular spline 27 having a corresponding inner teeth intermeshing is provided, which circular spline 27 radially abuts against the inner side of the housing 1 of the first drive module M1. A section of the so-called flexspline 28 is provided between the roller bearing 27 and the circular spline, which section comprises an outer teeth intermeshing and which is in engagement with the circular spline 27 and which forms the output element for the wave gear. The function of a wave gear, as known as such, shall not be further discussed herein.

The cup-shaped flexspline 28 extends axially downwardly up to the height of the radial bearing 11.

In the embodiment shown in FIG. 1, the second drive module M2 comprises a somewhat larger extension in axial direction of the drive unit. Therefore, the flexspline 28 is rotationally fixedly connected with an output shaft 30 by means of bolts 29 in order to provide the output, which output shaft 30 traverses the housing 6 of the second drive module M2. As shown in FIG. 4, for the purpose of assembly, the bolts 29 are actuated from the side of the first drive module M1.

The output shaft 30 comprises a corresponding flange 31, which receives the bolts 29. The bolts 29 in turn are received in threaded bores of a sleeve-like abutment ring 32. The abutment ring 32 and the flange 31 encase a flange section 33 of the cup-like flexspline 28 so that all components can be bolted together in a rotationally fixed, i.e., torque-transmitting manner.

The output of the wave gear thus will be transferred from the flexspline 28 onto the output shaft 30 of the second drive module M2.

Axially opposite to the flange 31 the output shaft 30, which is formed as a hollow shaft as well, comprises a further flange 34 which will be screwed to the face-side section of the housing 6 of the second drive module M2 in a rotationally fixed manner.

Inside the housing 6 the output shaft 30 is surrounded sealing sleeve 36. Thus, the transmission of a drive torque from the motor is performed via the drive shaft 22, via the wave gear providing the corresponding reduction and via the flexspline 28 as well as via the output shaft 30 onto the housing 6 of the second drive module M2, which thereby is rotated in relation to the first drive module M1, wherein the torque is transferred onto the housing 8 of the second arm member A2 via the ring groove 7 cooperating with the corresponding insert blocks 4, which second arm member A2 thereby is rotated in relation to the first arm member A1, which first arm member A1 is rotationally fixed to the first drive module M1.

A fourth drive module M4 is arranged on the housing cover 24 of the third drive module M3, which fourth drive module M4 comprises control components and a sensor system, which is intended for the detection of the input rotational speed and of the input torques resulting from the motor and for the detection of the output rotational speed and of the output torques resulting from the second drive module M2.

For that purpose, the drive shaft 22 extends out of the housing 18 and past the cover 24 up to the side of a circuit board 37 of the fourth drive module M4, which circuit board 37 is facing the cover 24, and cooperates there with corresponding sensors.

Figure 10:
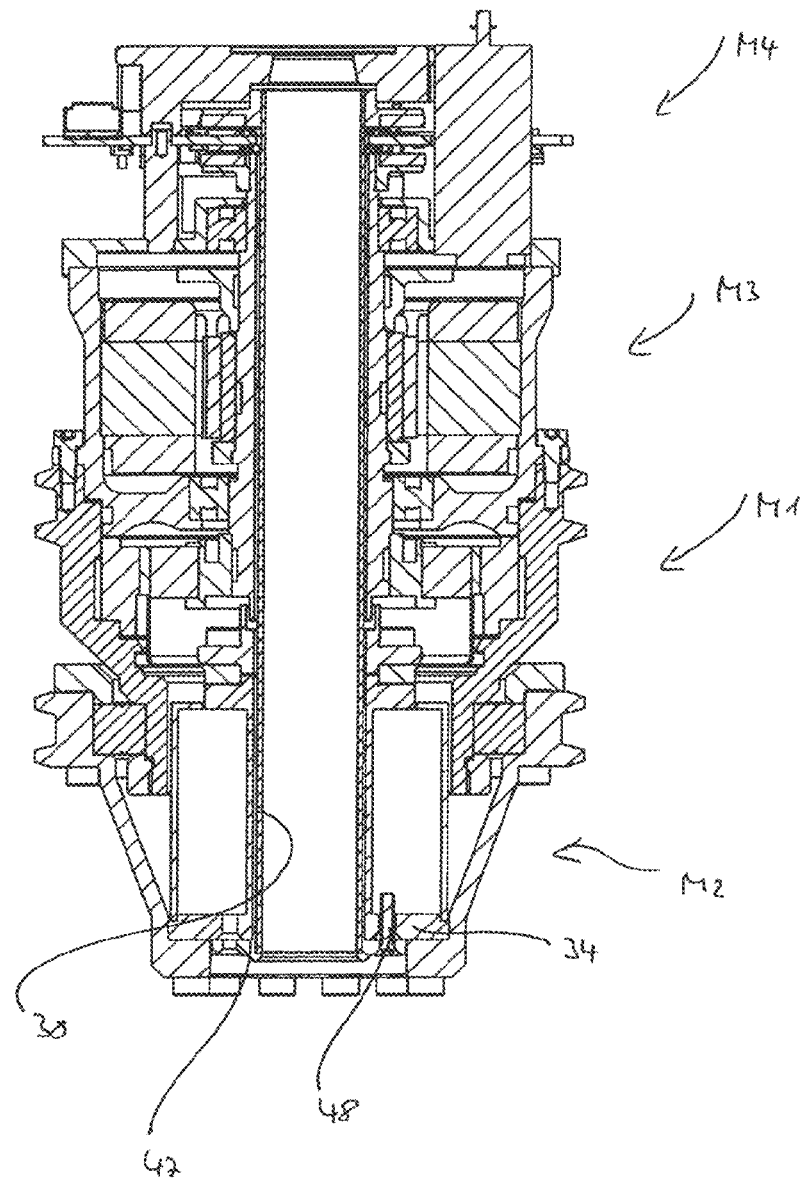
FIG. 10 is an axial longitudinal section along a modular drive unit in a fifth embodiment according to the invention.

As can be also seen from FIG. 4 the second drive module M2 comprises a sensor shaft 38 which is connected with the flange 34 and thereby with the housing 6 of the second drive module M2 in a torque-transmitting manner (cf. FIG. 10).

The sensor shaft 39, as shown by FIG. 1, extends upwards and traverses the output shaft 30, the abutment ring 32, the drive shaft 22 and the circuit board 37 with a certain radial distance up to the side of the circuit board 37, which side is opposite to the third drive module M3, in order to cooperate there with corresponding sensors. The modular configuration and design of the drive unit according to the invention with four drive modules M1-M4, which modular configuration is characterized by housing structures being designed and conceptualized of the same kind and between these housing structures by connecting mechanisms being designed and conceptualized of the same kind, allows to adapt the drive unit in dependency of the spatial, functional and/or performance-related circumstances and needs inside of or with respect to different configurations and designs of the arm members of a manipulator or of a robot arm of a robotic system, in particular of the light-weight assembly kind. In other words, the different drive modules M1-M4 each shall be exchangeable as such so that the drive unit according to the invention is adaptable as shall be illustrated by the description of the following embodiments.

Figure 5:
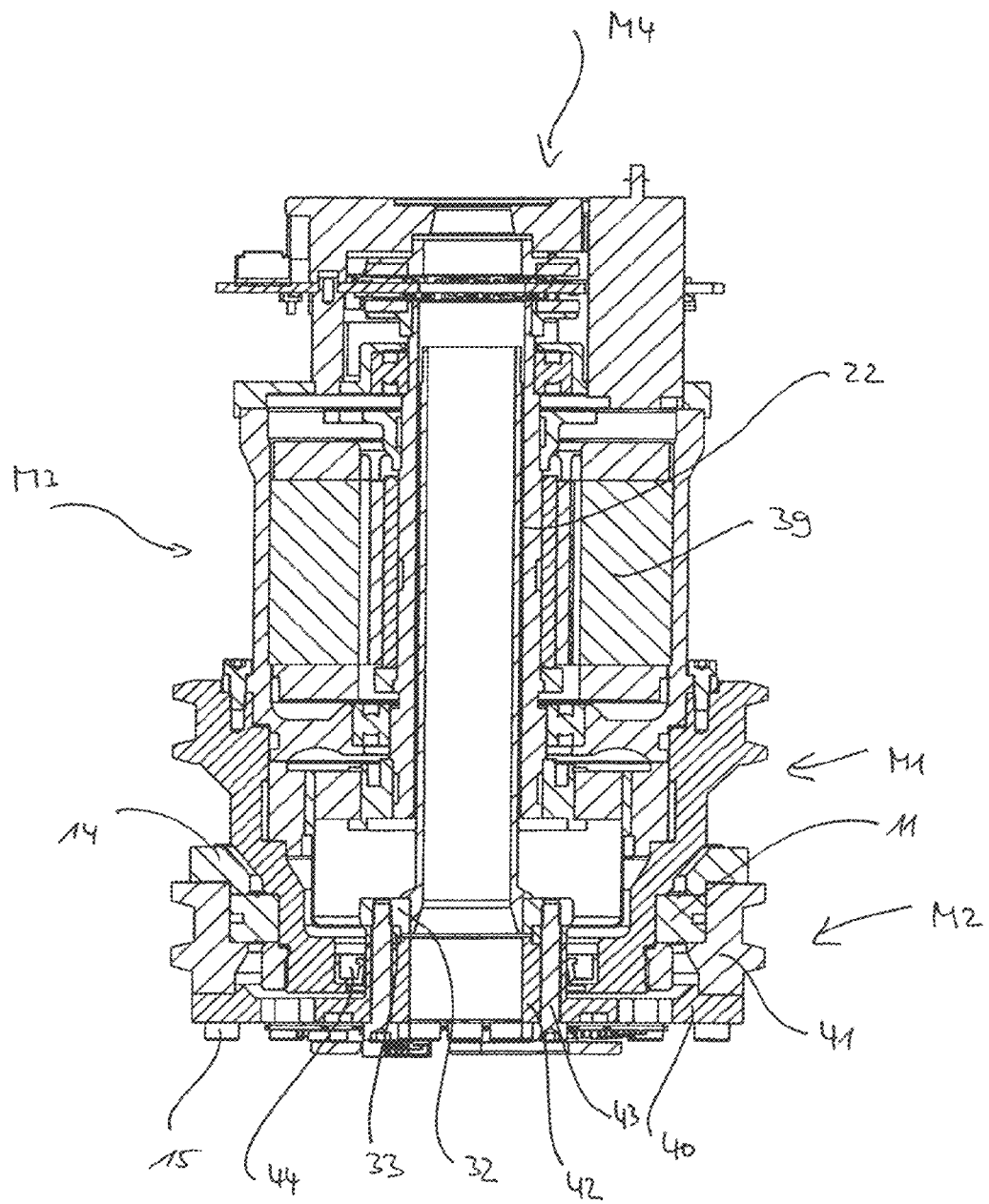
FIG. 5 is an axial longitudinal section along a modular drive unit in a second embodiment according to the invention.
Figure 6:
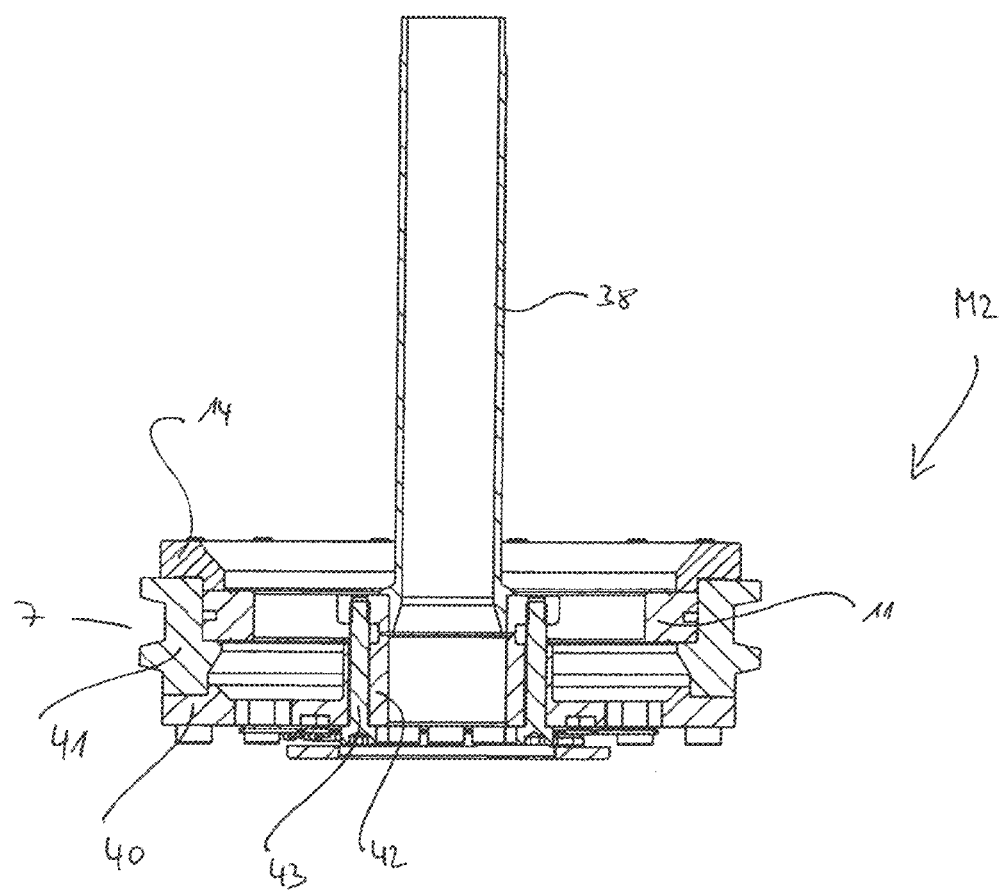
FIG. 6 shows a second drive module of the drive unit in a second embodiment according to the invention.
Figure 7:
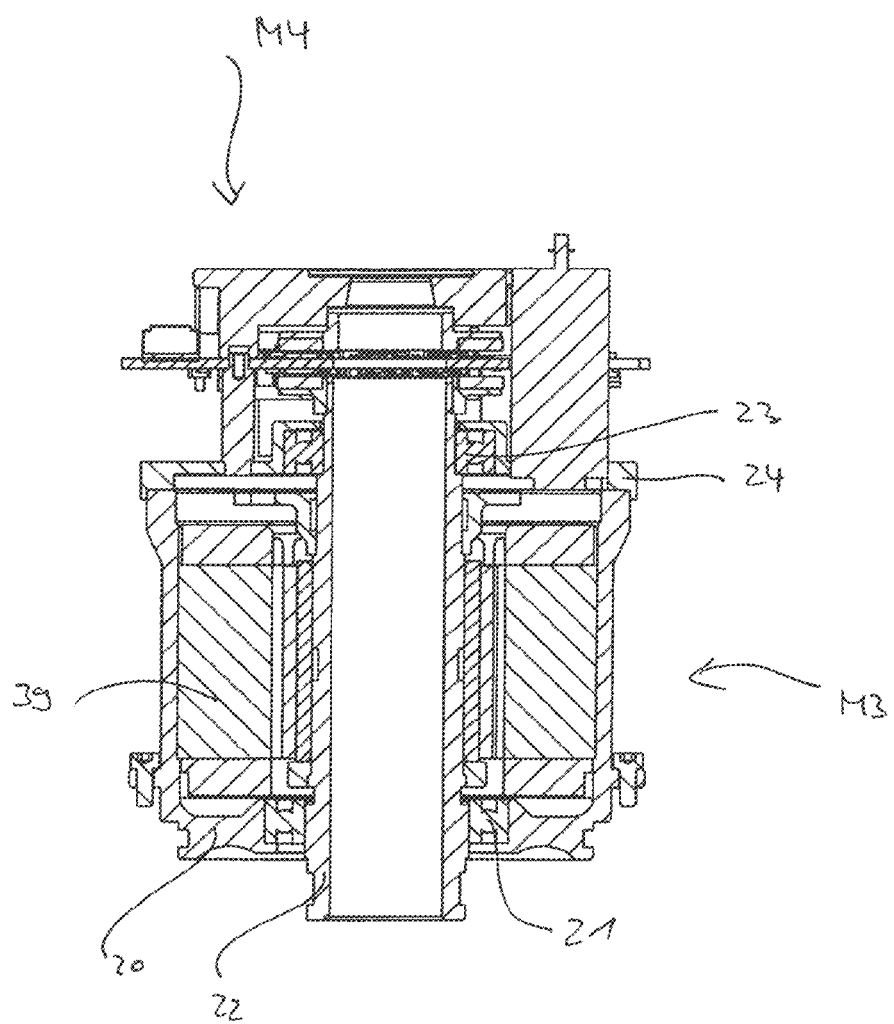
FIG. 7 shows a third and a fourth drive module of the drive unit in a second embodiment according to the invention.

Consequently, FIGS. 5 to 7 show a second embodiment of the drive unit according to the invention. In this context same components are associated with the same reference numerals. On the one hand the embodiment as shown in these figures distinguishes itself from the previous embodiment in that the third drive module M3 comprises a larger axial extension, by which a larger, more powerful electric motor 39 can be used. On the other hand, the second drive module M2 comprises a shorter axial length.

The second drive module M2 comprises a housing cover 40, which is directly connected with a housing ring 41 by means of bolts 15 during the fixation of the flange ring 14 for the radial bearing 11, which housing ring 41 comprises the ring groove 7 for the connection to a second arm member A2. The housing ring 41 is rotatably supported in relation to the housing 1 of the first drive module M1 in a way as it has been described already above in connection with the first embodiment.

Moreover, the housing cover 40 comprises a cylindrical and hollow section 42, which extends inwardly towards the first drive module M1, which cover 40 is connected to the abutment ring 32 in a rotationally fixed manner by means of bolts 43 from the side of the second drive module M2, in order to enclose the flange section 33 of the flexspline 28 of the wave gear. The section 42 further is surrounded by a sealing ring 44. This second embodiment of the drive unit thus is characterized by a more powerful electric motor with at the same time shorter assembly length.

Figure 8:
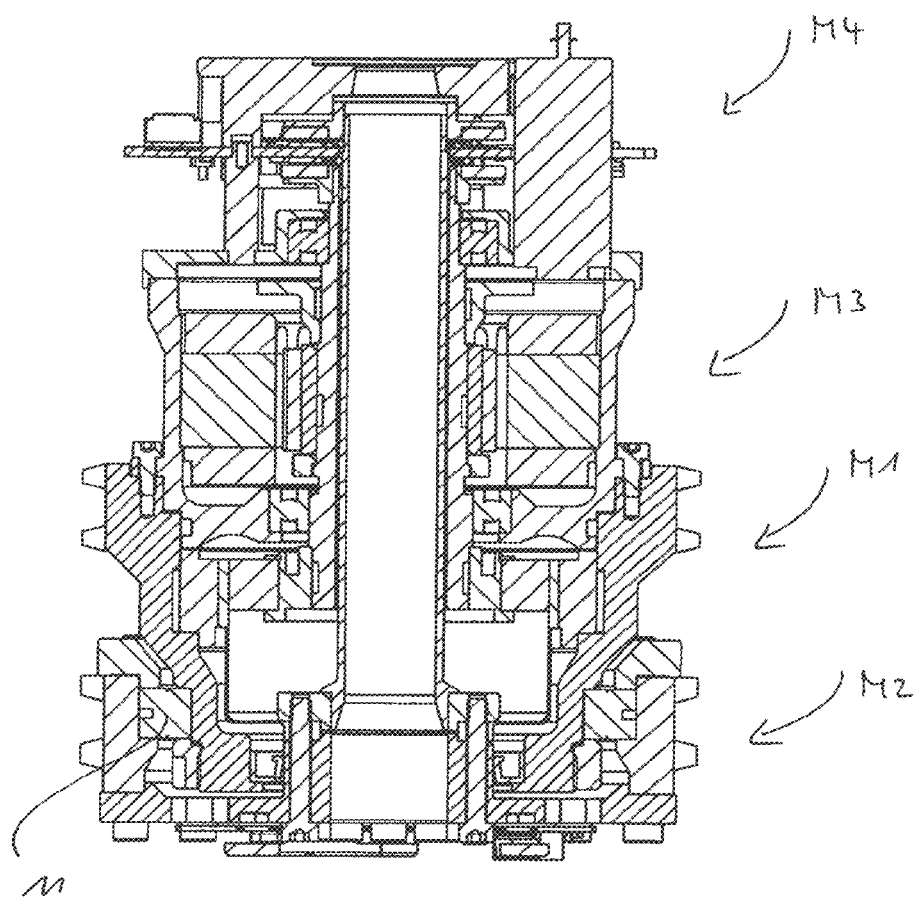
FIG. 8 is an axial longitudinal section along a modular drive unit in a third embodiment according to the invention.
Figure 9:
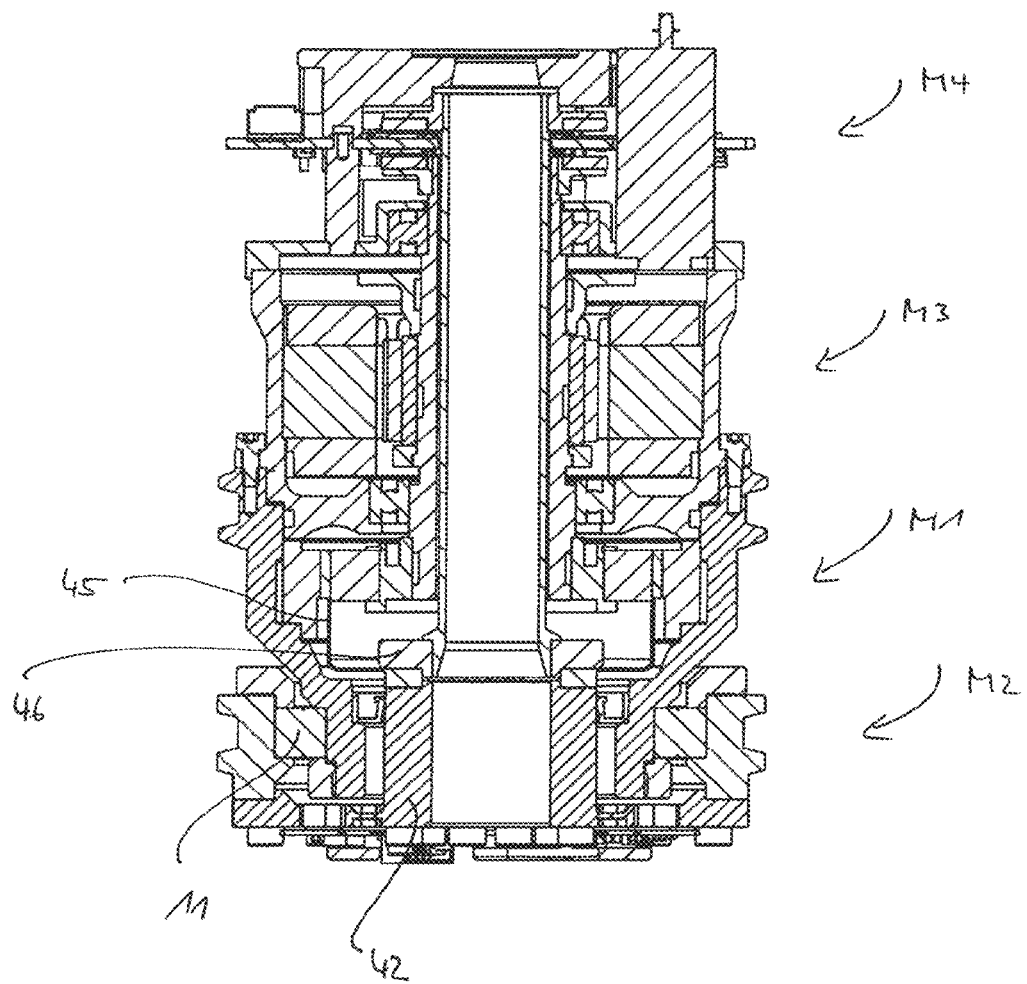
FIG. 9 is an axial longitudinal section along a modular drive unit in a fourth embodiment according to the invention.

In order to shorten the assembly length even further, in the third embodiment as shown in FIG. 8 the second drive module M2 is configured similar as in the second embodiment and the third drive module M3 is configured similar as in the first embodiment. In the fourth embodiment as shown in FIG. 9 the second drive module M2 is configured similar as in the second embodiment and the third drive module M3 is configured as in the first embodiment, while the first drive module M1 having the wave gear comprises a shorter axial length.

The flexspline 45 and the abutment ring 46 for the rotationally fixed connection with the section 42 of the housing cover 40 therefore are made shorter in axial direction. A fifth embodiment of the drive unit according to the invention is shown in FIG. 10. For this embodiment, the first drive module M1 having the wave gear is configured similar as in the fourth embodiment, while the third drive module M3 and the second drive module M2 are realized as in the first embodiment. In this FIG. 10 it can be recognized that the sensor shaft 38 comprises a flange 47, which is connected with the flange 34 of the output shaft 30 by means of bolts 48. In this way the sensor shaft 38 can be finally mounted after all of the drive modules M1 to M4 have been mounted.

As can be seen in FIG. 2, connecting rods 49, which also serve as spacers, are received in corresponding openings 50 in the housing cover 24 upon mounting the fourth drive module M4 onto the third drive module M3, e.g., by a corresponding press-fit. During that also a motor-side plug 51 comes into engagement with a circuit board-side socket 52 for providing the motor connection.

The invention claimed is:

1. A drive unit for a joint being arranged between two arm members of a manipulator of a robotic system, the drive unit being intended for rotary drive of one of the two arm members in relation to another one of the two arm members, the drive unit comprising:
   a first drive module with a housing, which first drive module is to be connected to a first arm member by means of at least one first connecting element in a force- and torque-transmitting manner, and
   a second drive module with a housing, which second drive module is to be connected with a second arm member by means of at least one second connecting element in a force- and torque-transmitting manner, wherein the second drive module is co-axially arranged with respect to the first drive module and is rotatably supported in relation thereto, wherein the first and second connecting elements are configured to cooperate with the first and second arm members in a radial direction with respect to a rotary axis of the drive unit,
   wherein the first and second connecting elements are each formed as radially surrounding grooves being integral with the respective housings and open radially outward.

2. The drive unit according to claim 1, wherein the first drive module and the second drive module are configured as rotationally symmetric components and wherein the grooves have a same diameter.

3. The drive unit according to claim 2, wherein further housing sections of the housings are offset radially and inwardly.

4. The drive unit according to claim 1, wherein the first drive module and the second drive module engage with each other in sections.

5. The drive unit according to claim 4, wherein at least one radial bearing is arranged between a radially outwardly arranged section of the housing of the first drive module and a radially inwardly arranged section of the housing of the second drive module.

6. The drive unit according to claim 5, wherein the radially outwardly arranged section and the radially inwardly arranged section are arranged in a radial direction inside of the second connecting element of the second drive module.

7. The drive unit according to claim 5, wherein the radial bearing is to be fixed in its axial position by means of a first fixation element, which is to be arranged at an end of the housing of the second drive module, which end faces the first drive module, and by means of a second fixation element, which is to be arranged at an end of the housing of the first drive module, which end faces the second drive module.

8. The drive unit according to claim 1, wherein a third drive module, which comprises a motor, is to be connected at the housing of the first drive module, co-axially opposite to the second drive module.

9. The drive unit according to claim 8, wherein the third drive module and the first drive module do engage in sections.

10. The drive unit according to claim 8, wherein a drive shaft to be actuated by the motor is rotatably supported in the third drive module, which a drive shaft extends into the first drive module and is to be connected with an input element of a gear, which is arranged in the first drive module.

11. The drive unit according to claim 10, wherein an output element of the gear is connected to the second drive module in a rotationally fixed manner.

12. The drive unit according to claim 11, wherein the output element of the gear is to be connected to an output shaft, which is connected with the housing of the second drive module in a rotationally fixed manner.

13. The drive unit according to claim 12, wherein the drive shaft and the output shaft each are formed as a hollow shaft and are arranged co-axially with each other.

14. The drive unit according to claim 8, wherein a fourth drive module is to be arranged at a side of the third drive module, co-axially opposite to the first drive module, which fourth drive module comprises a sensor device, and wherein a drive shaft extends out of the third drive module up to a side of the fourth drive module, which side faces the third drive module.

15. The drive unit according to claim 14, wherein the second drive module is connected with a sensor shaft in a rotationally fixed manner, traverses the drive shaft with a radial distance and extends up to the side of the fourth drive module.

16. The drive unit according to claim 14, wherein the third drive module is configured to cooperate with different designs and configurations of the fourth drive module.

17. The drive unit according to claim 8, wherein the first drive module is configured to cooperate with different designs and configurations of the third drive module.

18. The drive unit according to claim 1, wherein the first drive module is configured to cooperate with different designs and configurations of the second drive module in a rotating support.

19. The drive unit according to claim 17, wherein the third drive module and the second drive module are configured to cooperate with different designs and configurations of the first drive module.

20. The drive unit according to claim 1, wherein the first connecting element of the first drive module is integrally formed with its housing and the second connecting element of the second drive module is integrally formed with its housing.

21. A robot having a manipulator of several arm members comprising a drive unit according to claim 1 in at least one joint being arranged between the two arm members of the manipulator.

22. A method for manufacturing a drive unit for a joint being arranged between two arm members of a manipulator of a robotic system, the drive unit being intended for rotatory drive of one of the two arm members in relation to another one of the two arm members, wherein the drive unit comprises a plurality of drive modules, which are arranged co-axially to each other,
in which connecting a first drive module with a second drive module comprises steps of:
mounting a radial bearing on a section of a housing of the first drive module, in that a fixation element is arranged at an end of the housing of the first drive module, which end is facing the second drive module;
at least partially inserting the first drive module into the second drive module, so that a section of a housing of the second drive module overlaps the radial bearing;
mounting the radial bearing on the section of the housing of the second drive module, in that a fixation element is arranged at an end of the housing of the second drive module, which end is facing the first drive module, such that the radial bearing is enclosed in an axial position between the housing of the first drive module and the housing of the second drive module.

23. The method according to claim 22, wherein the first drive module comprises a gear, further comprising:
connecting an output element of the gear with the housing of the second drive module from a side of the gear and/or from a side of the second drive module.

24. The method according to claim 22, wherein the second drive module comprises an output shaft, further comprising:
connecting the output shaft with the housing of the second drive module and with an output element of a gear of the first drive module.

25. The method according to claim 22, further comprising a step of:
mounting a third drive module, which comprises a motor having a drive shaft, with the housing of the first drive module at a side being opposite to the second drive module thereby connecting the drive shaft with an input element of a gear.

26. The method according to claim 25, further comprising a step of:
mounting a fourth drive module at the third drive module co-axially opposite to the first drive module thereby realizing a motor connection.

27. The method according to claim 26, wherein the drive shaft and an output shaft of the second drive module are each formed as a hollow shaft, the fourth drive module comprises an opening and the second drive module is connected to a sensor shaft in a rotationally fixed manner, the further comprising a step of:
traversing the sensor shaft through the drive shaft of the third drive module, through the output shaft of the second drive module and through the opening of the fourth drive module with a radial distance, respectively.

28. The method according to claim 22, wherein the step of mounting the radial bearing on the section of the housing of the second drive module comprises clamping the fixation element onto the section of the housing of the second drive module by screws passing into the section of the housing of the second drive module from a side opposite the end of the housing of the second drive module which faces the first drive module.

* * * * *